United States Patent
Zhang

(10) Patent No.: US 8,157,253 B2
(45) Date of Patent: Apr. 17, 2012

(54) POSITIONING DEVICE

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 365 days.

(21) Appl. No.: 12/558,579

(22) Filed: Sep. 14, 2009

(65) Prior Publication Data

US 2010/0295226 A1 Nov. 25, 2010

(30) Foreign Application Priority Data

May 21, 2009 (CN) .......................... 2009 1 0302508

(51) Int. Cl.
*B23Q 3/18* (2006.01)

(52) U.S. Cl. ........................................... 269/60; 269/71

(58) Field of Classification Search ................... 269/60, 269/58, 71, 254 CS, 148, 249
See application file for complete search history.

(56) References Cited

U.S. PATENT DOCUMENTS

| | | | | |
|---|---|---|---|---|
| 5,005,813 A | * | 4/1991 | Lawrence | 269/236 |
| 5,149,071 A | * | 9/1992 | Oliveira | 269/43 |
| 5,599,007 A | * | 2/1997 | Oliveira | 269/271 |
| 6,247,690 B1 | * | 6/2001 | Wolf | 269/277 |
| 2010/0295226 A1 | * | 11/2010 | Zhang | 269/60 |

* cited by examiner

*Primary Examiner* — Lee D Wilson
(74) *Attorney, Agent, or Firm* — Altis Law Group, Inc.

(57) ABSTRACT

A positioning device for positioning an object includes a base with a platform and a first positioning unit slidably mounted to the platform. The first positioning unit includes a sliding piece slidable along a direction perpendicular to the platform. The sliding piece defines a substantially V-shaped hole along a direction parallel with the platform for the object extending through the hole. The opening of the "V" of the V-shaped hole faces to a direction perpendicular to the platform.

11 Claims, 5 Drawing Sheets

POSITIONING DEVICE

BACKGROUND

1. Technical Field

The present disclosure relates to positioning devices, and more particularly to a positioning device to aid positioning an object to be measured or processed.

2. Description of Related Art

In a production line, an object is often measured and processed. When the object is measured or processed, the object needs to be positioned firstly. Accordingly, how to quickly and accurately position the object is an important step for increasing production efficiency.

DETAILED DESCRIPTION

Figure 1:
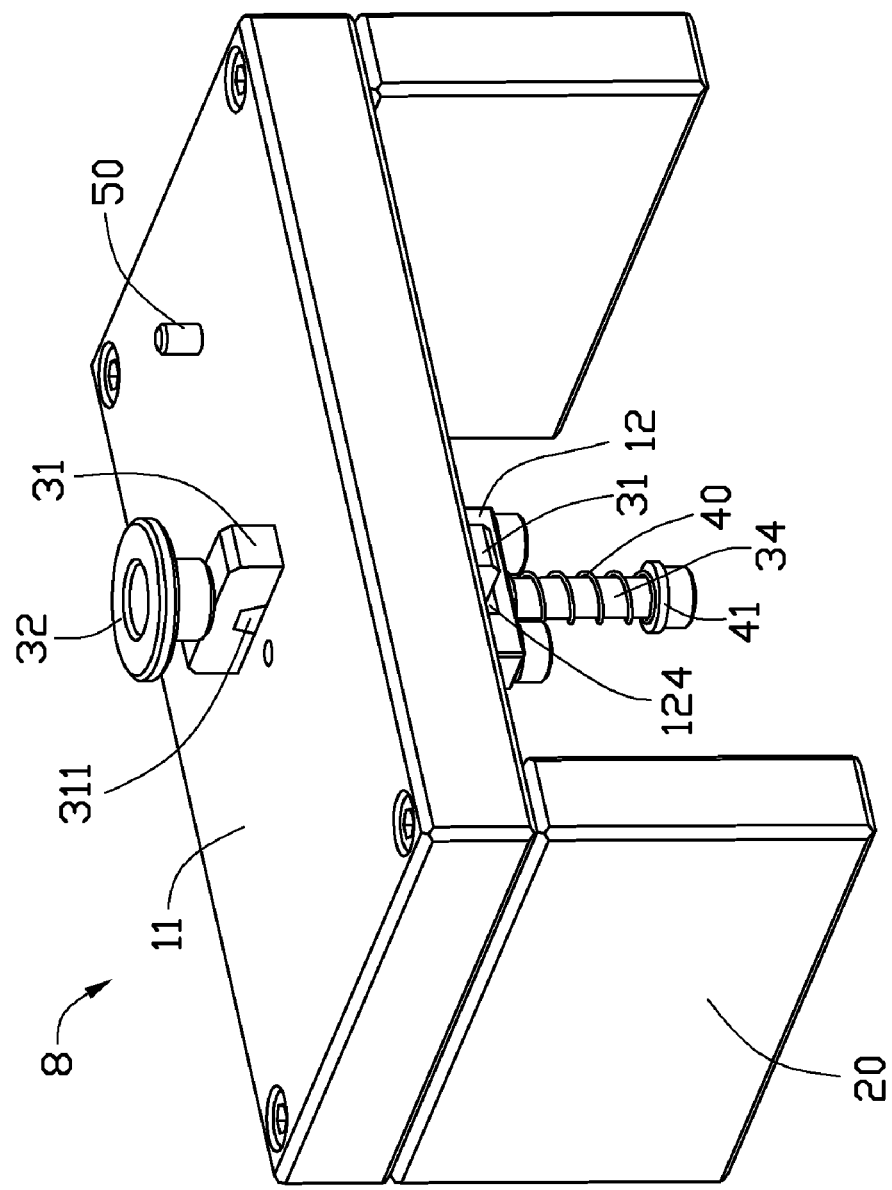
FIG. 1 is an isometric view of an embodiment of a positioning device.
Figure 2:
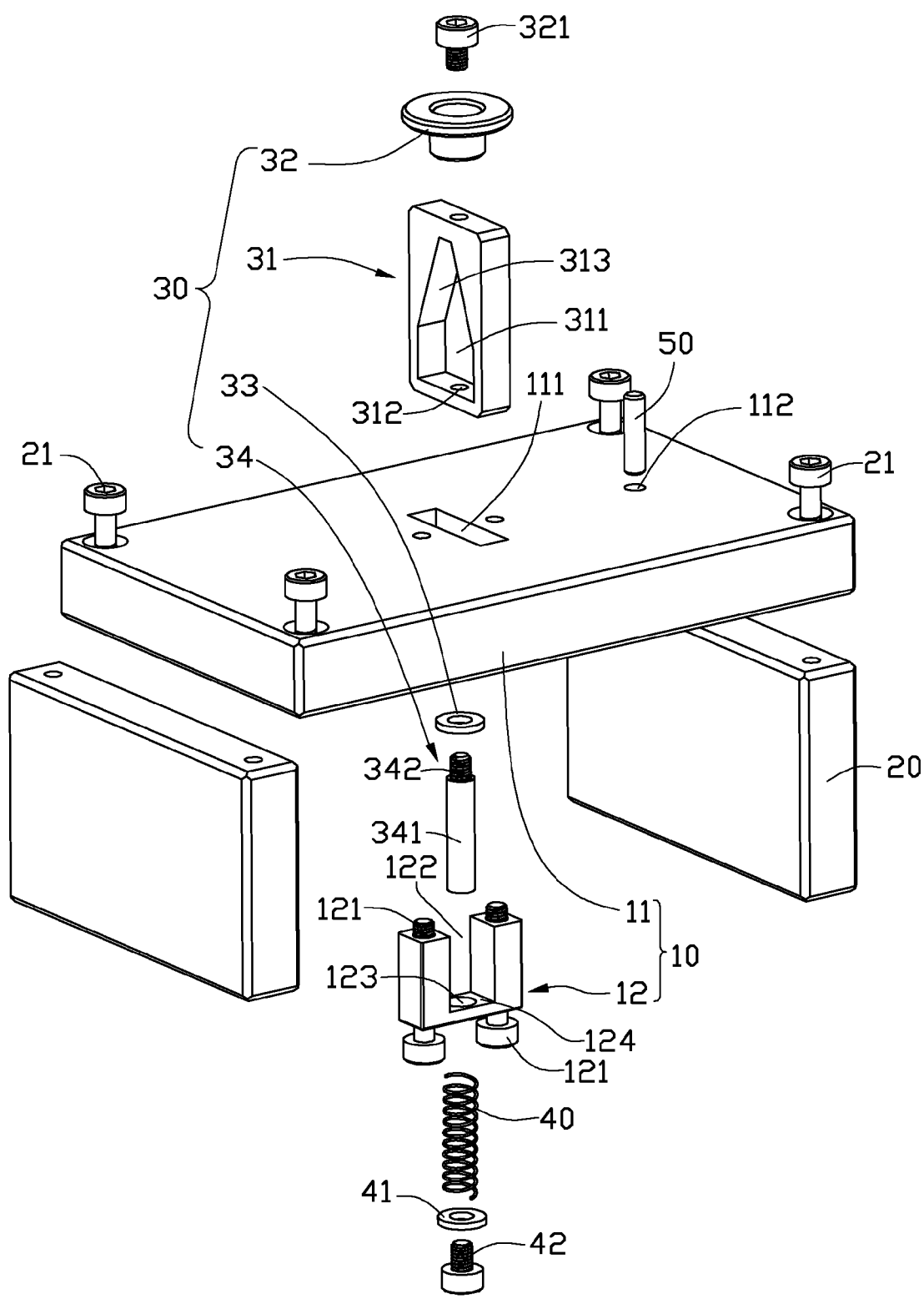
FIG. 2 is an exploded, isometric view of the positioning device in FIG. 1.

Referring to FIGS. 1 and 2, an embodiment of a positioning device 8 includes a base 10, two supports 20 oppositely mounted to a bottom of the base 10, a first positioning unit 30 slidably mounted to the base 10, an elastic unit 40 acting between the base 10 and the first positioning unit 30, and a second positioning unit 50 fixed to the base 10.

The base 10 includes a platform 11, and an extending block 12. A slide hole 111 is defined in a middle of the platform 11, vertically extending through a top and a bottom of the platform 11. A mounting hole 112 is defined in the platform 11, adjacent to a first end of the platform 11. The extending block 12 is fixed to the bottom of the platform 11 under the slide hole 111 via two screws 121. A groove 122 is defined in the extending block 12 along the extending direction of and communicating with the slide hole 111. A through hole 123, communicating with the groove 122, is defined in a bottom wall 124 of the groove 122. In other embodiments, the extending block 12 may be integrated formed on the bottom of the platform 11.

The supports 20 are mounted to opposite ends of the bottom of the platform 11 via screws 21 for supporting the base 10.

The first positioning unit 30 includes a sliding piece 31, a handle 32, a washer 33, and a bar 34. The sliding piece 31 is received in the slide hole 111 of the platform 11 and is vertically slidable in the slide hole 111. A substantially V-shaped hole 311 having a V-shaped wall 313, is defined in the sliding piece 31, through a thickness of the sliding piece 31 along a horizontal direction, wherein the opening of the "V" is downward. A screw hole 312 is defined in a bottom wall bounding the hole 311. The handle 32 is fixed to a top of the sliding piece 31 via a screw 321, for facilitating operating the first positioning unit 30. The bar 34 includes a cylindrical-shaped portion 341, and a screw bolt 342 extending from a top of the cylindrical-shaped portion 341. The screw bolt 342 is extended through the washer 33 and engaged in the screw hole 312, to fix the bar 34 to a bottom of the sliding piece 31, wherein the washer 33 is sandwiched between the bottom of the sliding piece 31 and the top of the cylindrical-shaped portion 341 of the bar 34. The washer 33 can prevent the sliding piece 31 from sliding out of the slide hole 111 when the sliding piece 31 is slid upward.

In one embodiment, the elastic unit 40 is a pressure spring. The elastic unit 40 is fitted about the cylindrical-shaped portion 341 of the bar 34. A screw 42 is extended through a washer 41 and screwed in a bottom of the cylindrical-shaped portion 341 of the bar 34 to fixed the washer 41 to the bar 34. Thereby, opposite ends of the elastic unit 40 respectively abut against the washer 41 and the bottom of the extending block 12.

In one embodiment, the second positioning unit 50 is a pin partially inserted into the mounting hole 112 of the platform 11.

When the positioning device 8 is not in use (see FIG. 1), the first positioning unit 30 slides to the lowest position under the gravity and the sliding piece 31 is supported on the bottom wall 124 of the extending block 12.

Figure 3:
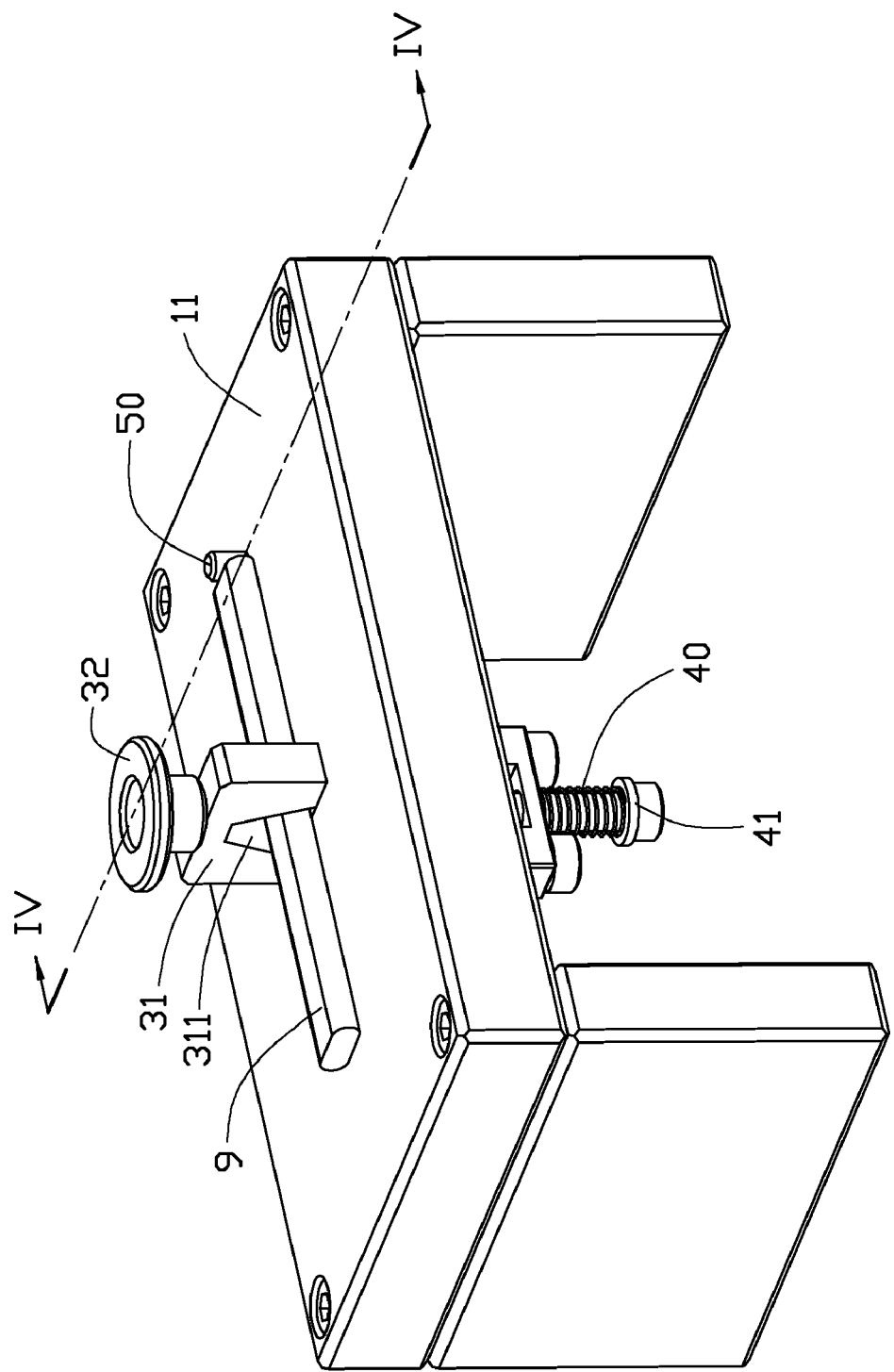
FIG. 3 is similar to FIG. 1, but showing the positioning device positioning a first object.
Figure 4:
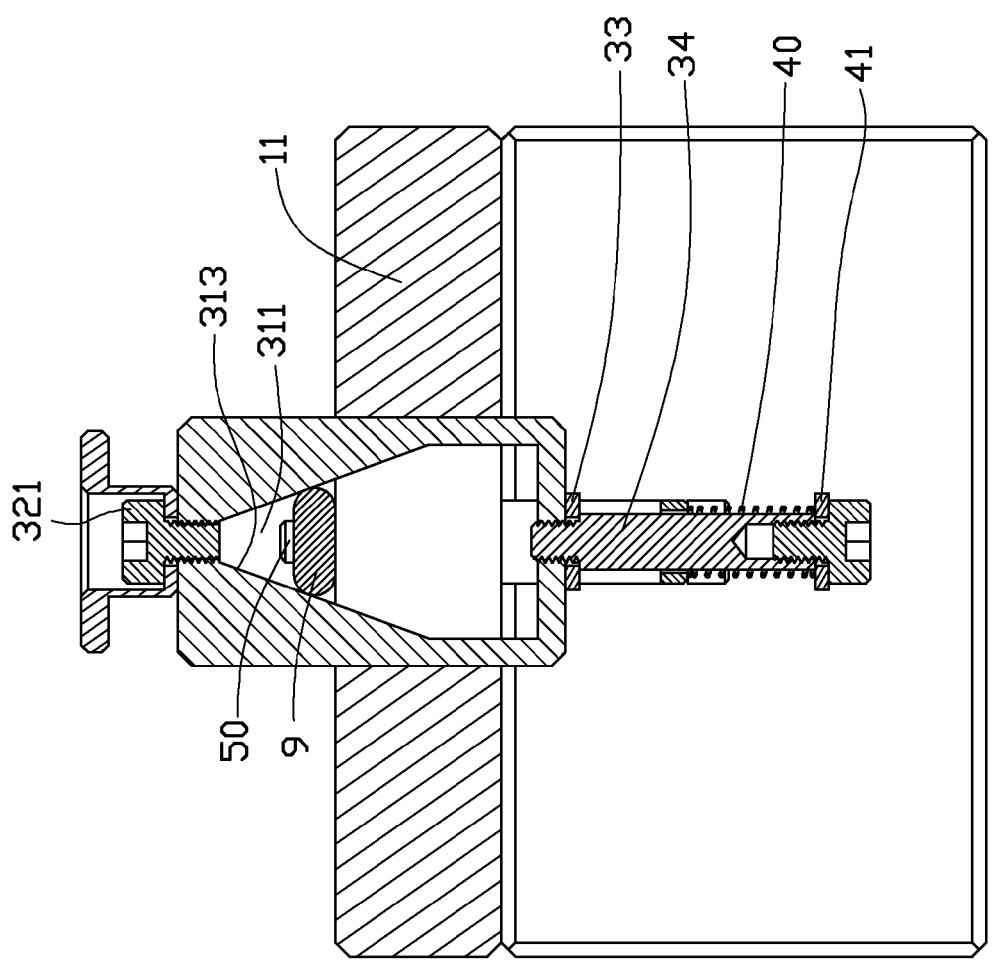
FIG. 4 is a cross-sectional view taken along the line IV-IV of FIG. 3.

Referring to FIGS. 3 and 4, the positioning device 8 can be used to position an elongated object 9. The object 9 includes flat top and bottom surfaces, and curved left and right side surfaces. The first positioning unit 30 is slid upward via operating the handle 32, and therefore the elastic unit 40 is compressed and cumulates elastic energy. A first end of the object 9 is extended through the hole 311 of the sliding piece 31, and is abutted against the second positioning unit 50. The object 9 is laid on the platform 11. The first positioning unit 30 is gently released to slide down under the elastic energy of the elastic unit 40 and the gravity, until the V-shape wall 313 of the hole 311 resists against the curved left and right side surfaces of the object 9. Thus, the object 9 is positioned. It is noted that if the first and second ends of the object 9 needs to be extend out of the platform 11 for a cutting process, the second positioning unit 50 may be uninstalled.

Figure 5:
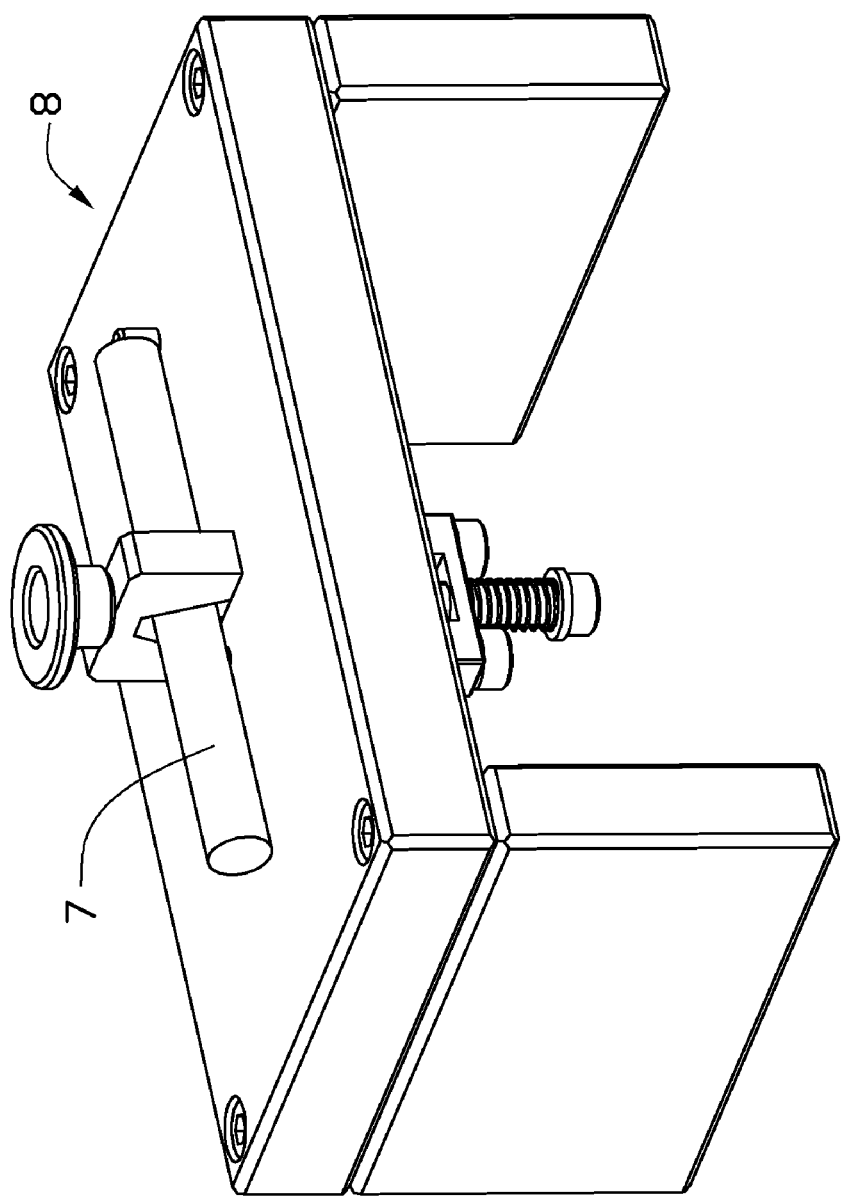
FIG. 5 is similar to FIG. 3, but showing the positioning device positioning a second object with a different shape from the first object.

Referring to FIG. 5, because the sliding piece 31 is capable of sliding in the slide hole 111 to adjust the amount of the inverted V-shaped hole 311 exposed above the platform 11, the positioning device 8 can be also used to position other objects with different shapes or sizes, such as an object 7 with a round cross-section.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A positioning device for positioning an object, comprising:
   a base comprising a platform comprising a top surface and a bottom surface opposite to the top surface; and
   a first positioning unit slidably mounted to the platform, wherein the first positioning unit comprises a sliding piece slidably extending through the top and bottom surfaces of the platform, the sliding piece defines a substantially V-shaped hole along a direction parallel with the platform for the object extending through the hole, wherein the opening of the "V" of the V-shaped hole is inverted;
   wherein the sliding piece slides along a direction perpendicular to the platform to adjust the amount of the V-shaped hole that is exposed above and bounded by the top surface of the platform, to position various different sized objects.

2. The positioning device of claim 1, wherein a slide hole is defined in the platform along a direction perpendicular to the platform, for slidably receiving the sliding piece.

3. The positioning device of claim 2, further comprising an elastic unit acting between the base and the first positioning unit, to bias the first positioning unit to slide along the direction that the opening of the "V" of the V-shaped hole faces to.

4. The positioning device of claim 3, wherein the base further comprises an extending block fixed to the bottom surface of the platform, a groove communicating with the slide hole of the platform is defined in the extending block.

5. The positioning device of claim 4, wherein the sliding piece comprises a bottom end that the opening of the "V" of the V-shaped hole faces to and a top end opposite to the bottom end, a through hole is defined in an end of the extending block away form the platform and communicates with the groove, the first positioning unit further comprises a bar fixed to the bottom end of the sliding piece and extending through the through hole, the elastic unit is a pressure spring fitted about the bar, a first washer is fixed to the bar, opposite ends of the elastic unit respectively abut against the first washer and the end of the extending block.

6. The positioning device of claim 5, wherein the first positioning unit further comprises a handle fixed to the top end of the sliding piece.

7. The positioning device of claim 5, wherein a second washer is fixed to the bottom end of the sliding piece to prevent the sliding piece from sliding out of the slide hole when the sliding piece slides along a direction that is pointed from the bottom end of the sliding piece to the top end of the sliding piece.

8. The positioning device of claim 7, wherein the bar comprises a cylindrical-shaped portion and a screw bolt extending from a first end of the cylindrical-shaped portion, the screw bolt extends through the second washer and screwed in the bottom end of the sliding piece to sandwich the second washer between the first end of the cylindrical-shaped portion and the bottom end of the sliding piece, to fix the second washer to the sliding piece, and the first washer is fixed to a second end opposite to the first end of the cylindrical-shaped portion via a screw.

9. The positioning device of claim 1, further comprising a second positioning unit mounted to the base and aligned with the V-shaped hole along the direction that the V-shaped hole is defined along to abut against the object.

10. The positioning device of claim 9, wherein the second positioning unit comprising a pin, the platform defines a mounting hole, the pin is partially inserted in the mounting hole.

11. The positioning device of claim 10, further comprising two supports oppositely mounted to the base for supporting the base.

\* \* \* \* \*